Nov. 5, 1963 J. R. URSCHEL ETAL 3,109,470
KNIFE ASSEMBLY
Filed Feb. 19, 1960
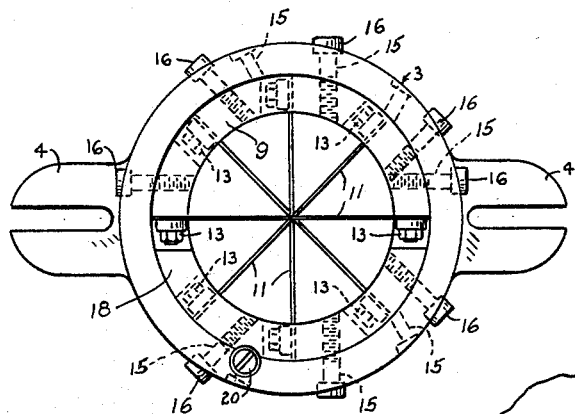
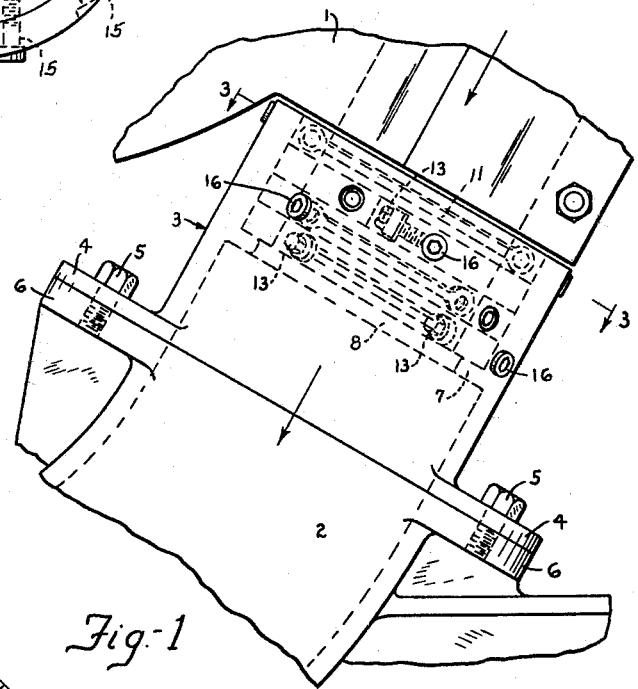
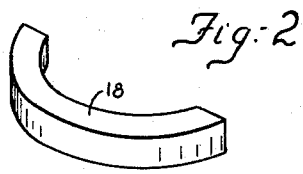
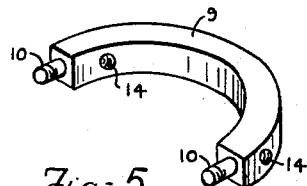
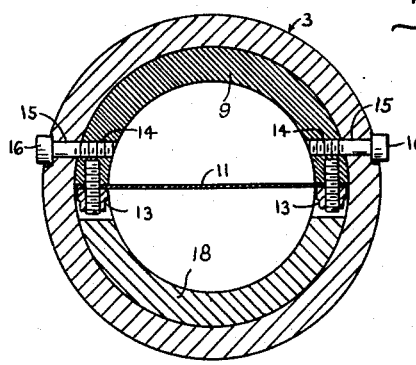
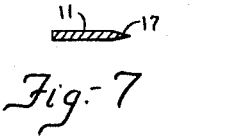
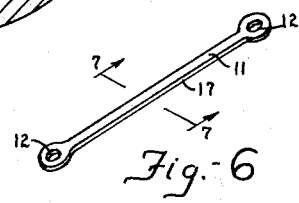
INVENTOR.
JOE R. URSCHEL
GERALD W. URSCHEL
BY Charles S. Penfold
ATTORNEY United States Patent Office 3,109,470
Patented Nov. 5, 1963

3,109,470
KNIFE ASSEMBLY
Joe R. Urschel, 202 Michigan Ave., and Gerald W. Urschel, 1614 Napoleon, both of Valparaiso, Ind.
Filed Feb. 19, 1960, Ser. No. 9,866
9 Claims. (Cl. 146—162)

The subject invention relates generally to a knife head or tubular cutter assembly in which the knives are disposed to cut a product into pieces or segments when it is directed through the assembly.

The cutter assembly embodying the invention is primarily designed and constructed to cut beets into segments or slices of various sizes but may be utilized to sever other food products into pieces. The assembly is preferably employed in conjunction with other apparatus, such as between a conveyor and a discharge spout as depicted in the J. R. Urschel et al. patent, No. 2,679,275, dated May 25, 1954. The assembly is adapted for support in a predetermined axial relationship to the discharge end of a conveyor so the knives will offer the only resistance to the free passage or flow of the beets through the assembly so as to obtain clean cut uniform segments or slices.

With the foregoing in mind, one of the principal objects of the invention is to provide a cutter head or assembly which comprises a tubular member or mounting and a plurality of elongate knives which are preferably arranged transversely with respect to one another in an axial relationship so that a beet will be successively cut by the knives.

More particularly, the assembly includes a mounting having an axially extending opening through which the product travels, a plurality of holders carrying thin elongate knives, and means for detachably and independently supporting the holders on the mounting.

An important object of the invention is to provide an assembly having components which can be readily interchanged and operatively associated together in different combinations so that the product can be cut into halves, quarters, sixths or eighths, depending on the number of knives employed.

A particularly important object of the invention is to arrange the knives in a manner whereby to substantially prevent any wedging action between the product and knives as compared to a conventional setup in which the knife edges are all disposed in the same plane.

A significant object of the invention is to design and construct the holders so that each preferably comprises a pair of opposed extremities which are joined together for relative movement so that when the ends of a knife are connected thereto, and the holders are supported on the mounting therefor, the extremities may be readily adjusted to tension the knife.

A specific object of the invention is to provide suitable complementary members for the holders and a spacer ring adapted for use in certain combinations of the holders.

Other attributes of the invention reside in providing an assembly which is stable, durable, efficient and offers advantages with respect to manufacture and assembly.

Additional objects and advantages of the invention will appear after the description hereinafter set forth is considered in conjunction with the drawings annexed hereto.

In the drawings:

FIGURE 1 is an elevational view showing the cutter assembly operatively connected with a guide and a discharge chute of a conveyor;

FIGURE 2 is a top view of the cutter assembly;

FIGURE 3 is a transverse section taken through the assembly, substantially on line 3—3 of FIGURE 1;

FIGURE 4 is a perspective view of one of a plurality of complementary members or spacers used in conjunction with one of a plurality of knife holders as shown in FIGURE 5;

FIGURE 5 is a perspective view of a knife holder;

FIGURE 6 is a perspective view of an elongate knife adapted for connection with a holder;

FIGURE 7 is an enlarged transverse section taken substantially on line 7—7 of FIGURE 6;

FIGURE 8 is a perspective view of a spacer ring, one or more of which may be used in certain of the combinations; and FIGURE 9 is a perspective view of one of the segments or slices which may be produced by the assembly.

The assembly embodying the invention may be utilized wherever applicable and as depicted in FIGURE 1 it is preferably mounted in an inclined position between a conveyor 1 and chute 2. The conveyor is preferably provided with guide means defining a trough or passage for directing the product toward the longitudinal axis of the assembly so that the product will primarily normally engage only the knives in passing through the assembly.

More particularly, the assembly comprises a tubular mounting, generally designated 3, provided at one extremity with a pair of outwardly extending slotted radial projections or ears 4 to facilitate firm securement of the mounting to the chute 2 by screws 5 which extend through the slots into flanges 6 carried by the chute. The mounting comprises a cylindrical wall defining an axial opening within which one or a plurality of corresponding knife units can be readily supported. The wall at the upper extremity of the mounting is preferably somewhat thicker than at its lower extremity. An internal annular flange 7 extends radially inward from the junction between the extremities to provide an abutment or seat for locating or assisting to locate one or more of the knife units in a predetermined position or positions within the confines of a socket defined by this flange and an inner cylindrical surface of the mounting. It will be noted that the flange is provided with an opening 8 having a diameter which is appreciably less than the diameter of a knife unit so that the flange will not interrupt the free flow or passage of the product through the mounting.

Each of the knife units includes an arcuate or curved holder or segment 9 having threaded studs 10 at its extremities which support an elongate knife 11 formed with enlarged ends provided with apertures 12 through which the studs project. Nuts 13 engage the studs for firmly detachably locking the knife to the extremities of the holder. The respective distances between the centers of the studs and the apertures are preferably equal so that the knife can be readily mounted on the studs in a relaxed or untensioned condition. Each of the holders is preferably square in cross-section and the studs are preferably threadedly connected to the extremities of the holder and constitute continuations thereof disposed in a substantially parallel relationship.

The holders may be supported in the mounting in various ways but as exemplified herein, the extremity of each holder is also provided with a threaded aperture 14. These apertures are axially aligned in a chordal relationship and extend through the holder. The upper cylindrical extremity of the mounting is provided with axially aligned and chordally arranged countersunk holes 15 which are disposed transverse or at right angles to the longitudinal axis of the mounting. Means, preferably in the form of a pair of corresponding cap screws 16, extend through the holes and threadedly engage the apertures 14 for supporting and locking a knife unit in place and at the same time afford a setup whereby the extremities of the holder can be moved relatively toward or away from one another, but preferably in opposite directions, to place the knife under varying degrees of tension or no tension at all. This relative movement is achieved in part by constructing each holder so that its diameter or curvature is somewhat less than the diameter or curvature of the socket which will permit the extremities of the holder to be drawn outwardly against the socket wall to tension the knife. The heads of the cap screws 16 are preferably provided with hexagonal sockets in order that the screws can be easily and quickly tightened or loosened by a wrench. The holders are constructed of a material which is substantially rigid but offers just sufficient resiliency that the extremities of the holders can be moved relative to one another by manipulating the cap screws.

Attention is directed to the fact that each holder constitutes substantially one-half an annular ring and that the end surfaces of the extremities of each holder through which the studs project are planar and diametrically aligned so that when the knives are respectively secured to the holders and the latter are properly supported in the mounting, the knives will be diametrically positioned for accurate and efficient cutting of the product.

The knives can be designed and constructed as desired but each is preferably made relatively thin and narrow with a sharp razor edge 17 as shown in FIGURE 7, extending substantially throughout its full length. The knives are relatively inexpensive as compared to the type adapted for resharpening and can be discarded when they become dull or damaged. The placement of the knives and their character is such that they offer very little resistance to the free flow of the product while it is being cut and therefore do not tear, damage or otherwise crush the cellular structure of the product.

As alluded to above, one or more knife units can be supported in the mounting. More particularly in this regard and as depicted in FIGURE 2, four knife units are shown as being arranged in the mounting so that the planes of the knives are circumferentially spaced apart forty-five degrees in order to cut or sever a product, such as a beet, into eight segments, one of which is illustrated in FIGURE 9. Since each of the knife units constitutes substantially one-half of an annular ring substantially only one-half of the annular space is taken up by the unit and in order to fill or take up the semi-circular space opposite each knife unit, an arcuate spacer member or segment 18 is employed. These spacer members have a cross-sectional configuration corresponding to that of the knife holders and are somewhat shorter in circumferential extent or length than that of the holders and constitute complements thereof as clearly depicted in FIGURE 3.

As best exemplified in FIGURE 8, there is shown an annular spacer member 19. One or more of these members and one or more of the arcuate spacer members 18 may be utilized in various combinations with one another and the knife holders depending on the number of segments or pieces one desires to have cut from the product.

More particularly in this respect and by way of example, if the product is to be severed into half segments a pair of annular spacer members or rings 19 are first placed on the internal flange 7 of the mounting, then an arcuate spacer member 18 and a knife holder (with the knife removed) upon the uppermost ring 19, followed by a knife unit and a spacer 18.

If four segments are desired, a pair of annular spacers 19 are placed in the mounting, followed by an arcuate spacer 18 and knife unit so that the knife is at right angles to a line between the slots in the ears 4, and then by a top knife unit with an arcuate spacer opposite the same.

When the product is to be cut in six segments, an annular spacer 19, then three knife units with three arcuate spacers 18 are successively arranged in the mounting so that the knives are sixty degrees apart.

If eight segments are desired, as alluded to above, then four knife units and four arcuate spacers 18 are supported in the mounting with the knives disposed forty-five degrees apart.

When any of the above organizations are made, it is desirable that the top knife always be parallel with the slots in the ears 4 at the base of the mounting or casting.

It will be noted that the knives are disposed in axial extending planes in close axial relationship to one another. In other words, the knife holders and various spacers are preferably secured in a stacked or superimposed abutting relationship to locate the knives in the operative positions desired. When the assembly is properly set up a screw 20 carried by the upper end of the mounting may be employed so that its head will overlie and secure an arcuate spacer 18 in place opposite the top knife unit. Attention is directed to the fact that the inner arcuate or curved surfaces of the holders 9 and arcuate spacers 18 and the inner annular surface of the spacers 19 define a tubular guide or cylindrical passage through which the product travels while being cut.

As alluded to above, the unique organization of knives shown and described above substantially prevents any wedging action between the knives and product as compared to a setup in which the knife edges are disposed in the same plane. In other words, the knives afford very little resistance to the free travel of the product through the assembly.

In view of the foregoing, it will be manifest that the invention enjoys the merits of simplicity, wide adaptability, reliability, and freedom from trouble or expense for maintenance.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. A cutter assembly comprising a stationary mounting provided with an opening extending axially therethrough, a curved flexible segment disposed in said opening and having opposed extremities, an elongate knife having ends detachably connected to the extremities of the segment, and means carried by the mounting connected to said extremities for supporting and flexing the segment to tension and locate the knife across the opening.

2. A cutter assembly comprising a stationary mounting provided with an opening through which a product is adapted for movement axially therethrough, a segment disposed in said opening and having opposed extremities, an elongate knife having ends detachably connected to the extremities of the segment, and means carried by the mounting for supporting the segment and imparting relative movement between its extremities to tension and locate the knife across the opening.

3. The assembly defined in claim 2, in which said means carried by said mounting comprises a pair of aligned screws which respectively extend chordally through portions of said mounting and threadedly connect with said opposed extremities of said segment for the purpose stated.

4. The assembly defined in claim 2, in which a spacer of a size substantially corresponding to that of said segment is disposed in said mounting diametrically opposite said segment.

5. The assembly defined in claim 2, in which: said mounting is provided with internal annular abutment means, said segment is supported in relation to said abutment means by said means carried by said mounting, and a spacer of a size substantially corresponding to that of said segment is disposed in said mounting and supported diametrically opposite said segment by said abutment means.

6. The assembly defined in claim 2, in which a spacer of a size substantially corresponding to that of said segment is disposed in said mounting diametrically opposite said segment in complementary relation thereto, and another segment carrying a knife and another spacer are supported in said mounting in a complementary relationship to one another and relative to said first mentioned segment, knife and spacer so that the knives are crossed.

7. The assembly defined in claim 2, including a second corresponding segment and knife connected thereto are disposed in said mounting, and another means carried by said mounting is provided for supporting said second segment to impart relative movement between its extremities to tension the knife thereon and locate the latter transverse to said first mentioned knife.

8. An assembly comprising a curved member having opposed extremities provided with aligned end surfaces, an elongate knife having ends, means carried by said extremities extending in a parallel relationship from said end surfaces and interlockingly connected to the ends of said knife for maintaining such ends in relation to said end surfaces, and additional means carried by said extremities for connecting the assembly to a mounting in a manner whereby said extremities can be spread apart to tension said knife.

9. The assembly defined in claim 8, in which: said means carried by each extremity of said curved member comprises a threaded stud, said ends of said knife are provided with holes which respectively receive said studs, nuts threadedly engage said studs for locking said knife to said segment, and said additional means on said extremities of said member are in the form of a pair of aligned screws.

References Cited in the file of this patent

UNITED STATES PATENTS

| | | |
|---|---|---|
| 1,864,147 | Rantine | June 21, 1932 |
| 1,865,986 | White | July 5, 1932 |
| 2,283,029 | Bakewell | May 12, 1942 |
| 2,572,770 | Shadduck | Oct. 23, 1942 |
| 2,581,501 | Shaver | Jan. 8, 1952 |
| 2,707,504 | Hill | May 3, 1955 |
| 2,884,974 | Woodward | May 5, 1959 |

FOREIGN PATENTS

| | | |
|---|---|---|
| 1,072,960 | France | Mar. 17, 1954 |